US010642696B2

(12) United States Patent
Price et al.

(10) Patent No.: US 10,642,696 B2
(45) Date of Patent: *May 5, 2020

(54) COPYING COMPRESSED PAGES WITHOUT UNCOMPRESSING THE COMPRESSED PAGES

(71) Applicant: BMC Software, Inc., Houston, TX (US)

(72) Inventors: Thomas G. Price, Austin, TX (US); Richard W. Cline, Austin, TX (US)

(73) Assignee: BMC Software, Inc., Houston, TX (US)

( * ) Notice: Subject to any disclaimer, the term of this patent is extended or adjusted under 35 U.S.C. 154(b) by 287 days.

This patent is subject to a terminal disclaimer.

(21) Appl. No.: 15/680,718

(22) Filed: Aug. 18, 2017

(65) Prior Publication Data

US 2017/0364410 A1    Dec. 21, 2017

Related U.S. Application Data

(63) Continuation of application No. 14/463,236, filed on Aug. 19, 2014, now Pat. No. 9,753,811, which is a continuation of application No. 12/485,664, filed on Jun. 16, 2009, now Pat. No. 8,843,449.

(51) Int. Cl.
*G06F 11/14* (2006.01)
*G06F 16/22* (2019.01)

(52) U.S. Cl.
CPC ...... *G06F 11/1446* (2013.01); *G06F 11/1451* (2013.01); *G06F 11/1466* (2013.01); *G06F 16/2272* (2019.01); *G06F 2201/80* (2013.01)

(58) Field of Classification Search
CPC ............. G06F 11/1446; G06F 11/1451; G06F 11/1466; G06F 16/2272; G06F 2201/80
See application file for complete search history.

(56) References Cited

U.S. PATENT DOCUMENTS

| 3,603,937 | A | * | 9/1971 | Loizides | ............. G06F 16/9014 |
| 3,646,524 | A | * | 2/1972 | Clark, IV et al. | ...... H03M 7/30 |
| 5,630,092 | A |   | 5/1997 | Carreiro et al. | |
| 5,694,619 | A |   | 12/1997 | Konno | |
| 5,813,017 | A | * | 9/1998 | Morris | ................ G06F 11/1451 |

(Continued)

*Primary Examiner* — Grace Park
*Assistant Examiner* — Hubert Cheung
(74) *Attorney, Agent, or Firm* — Brake Hughes Bellermann LLP

(57) ABSTRACT

Methods, devices and systems to make compressed backup copies of in-use compressed database indices are described. In general, an "oldest" time at which index pages in working memory had been updated is identified. Compressed index pages may be directly copied without the need to bring them into working memory or uncompressing them. The identified "oldest" time is then associated with the compressed backup copy. In some embodiments, an entire compressed backup copy may be associated with a single point in time (e.g., the identified "oldest" time). In other embodiments, a compressed backup copy may be associated with multiple points in time (e.g., one time for each portion of the compressed index that is being backed-up). Compressed indices copied in accordance with the invention may be used during restore operations to reconstruct database indices using the identified "oldest" time and database log files.

20 Claims, 5 Drawing Sheets

(56) References Cited

U.S. PATENT DOCUMENTS

| | | | |
|---|---|---|---|
| 5,864,849 A | 1/1999 | Bohannon et al. | |
| 5,901,277 A | 5/1999 | Chu et al. | |
| 6,282,041 B1 * | 8/2001 | Blumenau | G06F 3/061 |
| | | | 360/48 |
| 6,349,150 B1 | 2/2002 | Jones | |
| 6,457,021 B1 | 9/2002 | Berkowitz et al. | |
| 6,654,746 B1 | 11/2003 | Wong et al. | |
| 6,721,753 B1 | 4/2004 | Kataoka et al. | |
| 7,225,208 B2 | 5/2007 | Midgley et al. | |
| 7,257,689 B1 | 8/2007 | Baird | |
| 7,257,690 B1 | 8/2007 | Baird | |
| 7,395,358 B2 | 7/2008 | Mills et al. | |
| 7,702,670 B1 | 4/2010 | Duprey et al. | |
| 7,739,250 B1 | 6/2010 | Hamilton et al. | |
| 7,747,589 B2 * | 6/2010 | Lomet | G06F 16/2477 |
| | | | 707/696 |
| 7,860,832 B2 | 12/2010 | Midgley et al. | |
| 7,958,289 B2 | 6/2011 | Benveniste et al. | |
| 8,010,949 B2 | 8/2011 | Barsness et al. | |
| 8,027,955 B2 | 9/2011 | He et al. | |
| 8,108,356 B2 | 1/2012 | Whang et al. | |
| 2002/0087500 A1 | 7/2002 | Berkowitz et al. | |
| 2003/0115082 A1 * | 6/2003 | Jacobson | G06F 19/321 |
| | | | 705/2 |
| 2004/0148303 A1 | 7/2004 | McKay et al. | |
| 2005/0015374 A1 | 1/2005 | Reinauer et al. | |
| 2005/0071390 A1 * | 3/2005 | Midgley | G06F 11/1451 |
| 2005/0131990 A1 | 6/2005 | Jewell | |
| 2005/0216658 A1 | 9/2005 | Muto et al. | |
| 2007/0022146 A1 * | 1/2007 | Murley | G06F 16/2308 |
| 2007/0180530 A1 | 8/2007 | Verma et al. | |
| 2007/0183272 A1 * | 8/2007 | Yamada | G11B 20/00007 |
| | | | 369/30.04 |
| 2007/0294321 A1 | 12/2007 | Midgley et al. | |
| 2008/0077618 A1 | 3/2008 | Wang et al. | |
| 2008/0307018 A1 | 12/2008 | Ulrich et al. | |
| 2009/0164524 A1 | 6/2009 | Whang et al. | |
| 2010/0114843 A1 | 5/2010 | Farrar et al. | |
| 2010/0198829 A1 * | 8/2010 | Elzinga | G06F 16/2228 |
| | | | 707/741 |
| 2011/0252326 A1 * | 10/2011 | Asano | G06F 11/30 |
| | | | 715/736 |

\* cited by examiner

COPYING COMPRESSED PAGES WITHOUT UNCOMPRESSING THE COMPRESSED PAGES

CROSS-REFERENCE TO RELATED APPLICATION

This application is a continuation application of U.S. application Ser. No. 14/463,236, filed Aug. 19, 2014, entitled "Unobtrusive Copies of Actively Used Compressed Indices", now issued as U.S. Pat No. 9,753,811, which is a continuation application of U.S. application Ser. No. 12/485,664, filed Jun. 16, 2009, entitled "Unobtrusive Copies of Actively Used Compressed Indices", now issued as U.S. Pat. No. 8,843,449, both of which are incorporated by reference in their entirety.

BACKGROUND

The invention relates generally to backup copies of database indices and more particularly to making compressed copies of in-use compressed database indices.

For some time, database management systems (DBMS) have provided the option to retain data in a compressed format on storage devices. More recently, some database systems such as DB2® for z/OS, have started providing an option to store index data on storage devices in compressed format as well. (DB2 is a registered trademark of the International Business Machines Corporation.)

Because database indices are frequently accessed concurrently by multiple users, database management systems often retain some index pages in working memory (i.e., those pages currently being accessed by the users). To be available for access, pages must normally be uncompressed. Accordingly, index pages are typically uncompressed as they are brought into working memory from an external storage device such as a network coupled file server.

As part of a database management systems' normal operations, backup copies of indices are frequently made for recovery purposes. Known prior art methods of making backup copies of in-use compressed database indices bring each page of the target index into working memory, uncompress it and write it out to a backup data set(s) or file(s)—in uncompressed format. During these operations, uncompressed versions of the index pages currently in working memory (i.e., those available for immediate access by users) are locked while the uncompressed pages are written to the backup data set(s) or file(s). While locked, the pages may be read accessed, but cannot be updated. Thus, the locks can block user actions—that is, prior art techniques utilize locks and are, therefore, obtrusive to user actions.

These prior approaches require time to bring each compressed page into working memory, processor time to uncompress the pages, time to write each uncompressed page to a backup copy file(s) and block users from updating currently in-use pages because of the use of locks. In addition, because the backup copies are in an uncompressed format they can require a substantial amount of memory to store (e.g., on an external storage device). Thus, it would be beneficial to provide a mechanism to backup in-use compressed database indices that avoid these drawbacks.

SUMMARY

In one embodiment the invention provides a method to perform a backup operation on an in-use compressed database index. The method includes identifying a target in-use compressed index and an externalization point for the target index, copying pages of the target index to make a backup copy (without uncompressing any of the copied index pages) and registering the backup copy and externalization point so that they may be retrieved and used during a subsequent restore operation. In one embodiment, a single externalization point is identified for an entire target index. In another embodiment, multiple externalization points are identified for a target index—one externalization point for each different portion (e.g., a collection of pages) of the target index. In still another embodiment, incremental backup copies of compressed indices may be made. Here, the incremental backup may be based on a prior generated backup copy produced in accordance with the backup method described herein.

In yet another embodiment, the invention provides a method to restore a previously backed-up and compressed copy of an in-use compressed database index. The method includes obtaining a first portion of the compressed backup copy (e.g., one or more pages), identifying an externalization point previously recorded for the retrieved first portion, decompressing the retrieved first portion and updating the decompressed index information by applying log updates beginning at the externalization point to a specified second time. The updated portion of the index may then be stored in a compressed format.

The described backup process can employ hardware copy techniques wherein the compressed index pages of the target index may be copied without bringing them into working memory or uncompressing them. This permits the copy aspect of the described backup operation to proceed substantially independent of the processor/computer system performing the backup operation. The described restore operation utilizes a compression technique wherein the compression of one page (i.e., a page of the index that is uncompressed and in working memory) does not affect the content/compression of any other page of the database index being restored.

A computer executable program to implement the described backup and restore operations may be tangibly stored in any media that is readable and executable by a computer system.

DETAILED DESCRIPTION

Methods, devices and systems to make and use compressed backup copies of in-use compressed database indices are described. As used herein, a "compressed index" is a database index that is stored in a compressed format on one or more long-term storage devices but which is uncompressed (generally in a page-by-page fashion) as it is brought into working memory during use (typically a memory buffer). The phrase "in-use compressed index" means a compressed index in which at least some of the compressed index information is uncompressed and in working memory, while other portions of the index remain in compressed form on one or more storage devices. In some embodiments, an entire index copied in accordance with the invention is associated with a single point in time (that time at which the earliest update to a page in working memory was made and not yet externalized). In other embodiments, an index copied in accordance with the invention may be associated with multiple points in time (e.g., one time for each portion of the compressed index that is copied). Compressed indices copied/backed-up in accordance with the invention may be used during restore operations to reconstruct database indices (generally in conjunction with database log files).

The following descriptions are presented to enable any person skilled in the art to make and use the invention as claimed and are provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

While investigating the problem of making and using compressed copies of in-use compressed database indices, it was recognized that if the compression technique applied to the index pages could create cross-page modifications it would not, in general, be practical to make such copies. That is, if the act of compressing a first in-use index page during its externalization to a storage device could affect the content and/or compression of a page already compressed and retained on a storage device, it would not, in general, be practical to make compressed backup copies. The problem with cross-page compression effects is that compression and storage of a page not yet copied during the backup process (e.g., page A) could affect the content/compression of a page already backed-up or copied (e.g., page B). If this occurs, the previously copied page (e.g., page B) would not be consistent with other copied pages (e.g., page A) rendering the entire backup copy unusable. Unexpectedly, it was recognized that compressed copies of in-use compressed indices could be made if the database management system applied compression techniques that did not cause cross-page compression effects.

Figure 1:
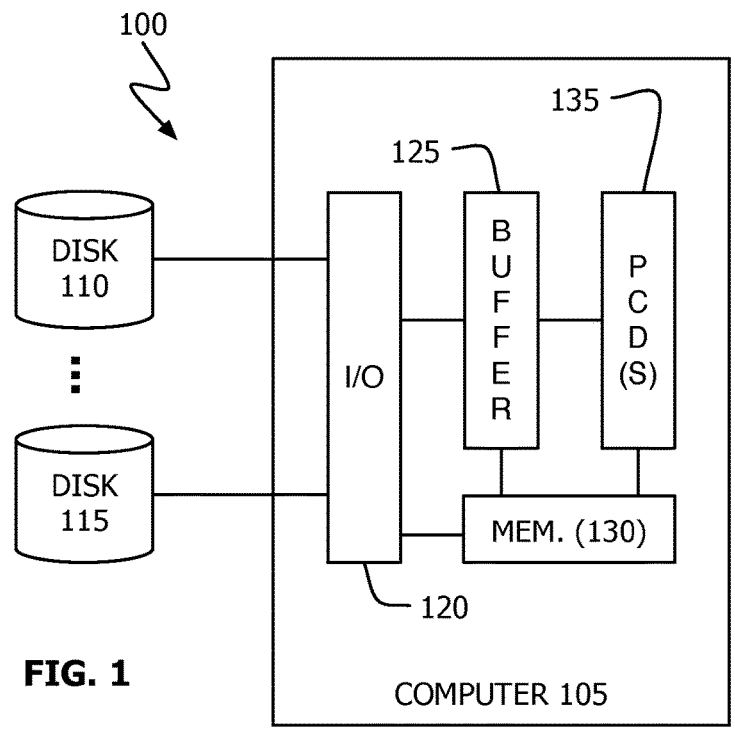
FIG. 1 shows, in block diagram form, a processing environment within which embodiments of the invention may be used.

Referring to FIG. 1, processing environment 100 in accordance with one embodiment of the invention comprises computer system 105 and one or more external storage devices such as disk units 110 and 115. Computer system 105 itself may include input-output (I/O) subsystem 120, buffer memory 125, working memory 130, and one or more programmable control devices 135 (e.g., general and/or special purpose central processing units). I/O subsystem 120 mediates the transfer of data between external storage sources (e.g., disks 110 and 115) and operational units within computer system 105 (e.g., buffer memory 125 and working memory 130). Buffer memory 125 typically includes volatile random access memory and is used by processes (including operating system processes) executing on one or more of programmable control devices 135. Memory 130 may include volatile and non-volatile memory elements and may include buffer memory 125.

Figure 2:
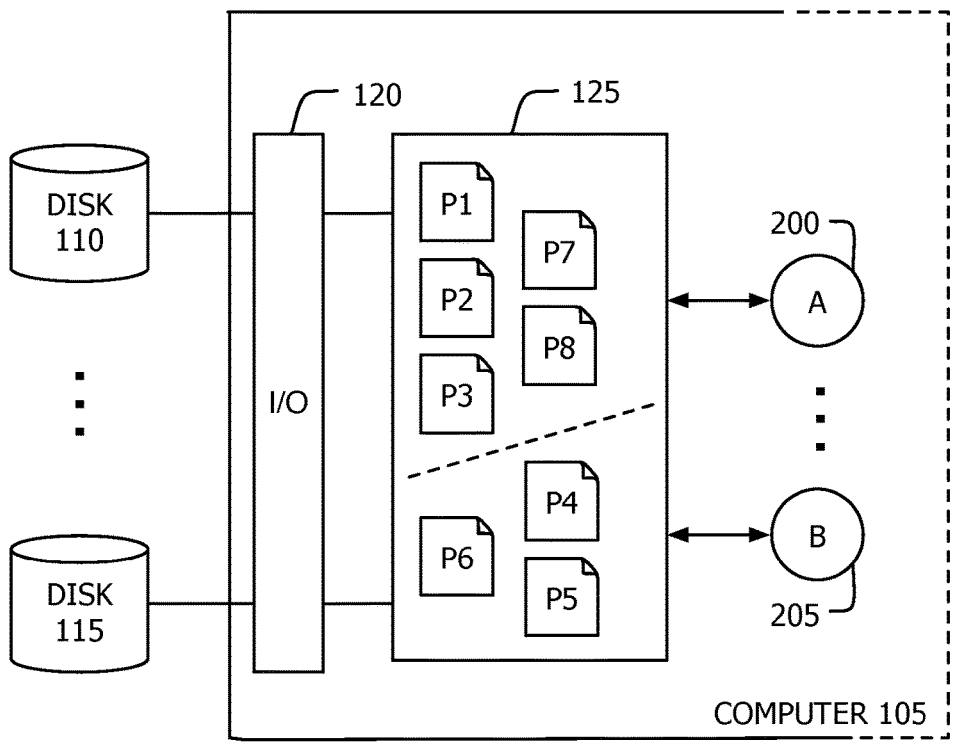
FIG. 2 shows, in block diagram form, a computer system for use with various embodiments of the invention.

Referring to FIG. 2, during database operations multiple processes may be executing and accessing buffer memory 125 (e.g., processes 200 and 205). Each of process 200 and 205 may, for example, be executing within or through a common database management system application (e.g., a relational database management system or RDBMS application). Alternatively, processes 200 and 205 may be accessing buffer memory 125 through different applications.

During database operations, data and index information may be brought into buffer memory 125 for use by active processes such as 200 and 205. If the information retrieved from external storage is compressed, it is decompressed whereafter it may be used by whatever executing processes have access and authorization to do so. It will be recognized by those of ordinary skill in the art that information (e.g., data and index information) is typically organized into specified sizes referred to as pages. Referring again to FIG. 2, page P1 through P8 are loaded into memory buffer 125. As shown by the dashed line, process 200 has access to pages P1→P3, P7 and P8 while process 205 has access to pages P4→P6.

In general, each time a page is modified that page is not written to external storage. Rather, it is modified in buffer memory 125 and an entry indicating what was done to the page is made in a specified log file. Occasionally pages are written to external storage (typically on a set schedule or on the occasion of an event such as the page being swapped out of buffer memory 125, becoming "full" or on command from an external process such as 200). This process is referred to as "externalizing" a page. If the page being externalized contains index information and the associated index is stored in compressed form, the page is compressed as it is written to external storage. The act of externalizing a page is generally recorded in one or more log files.

Figure 3:
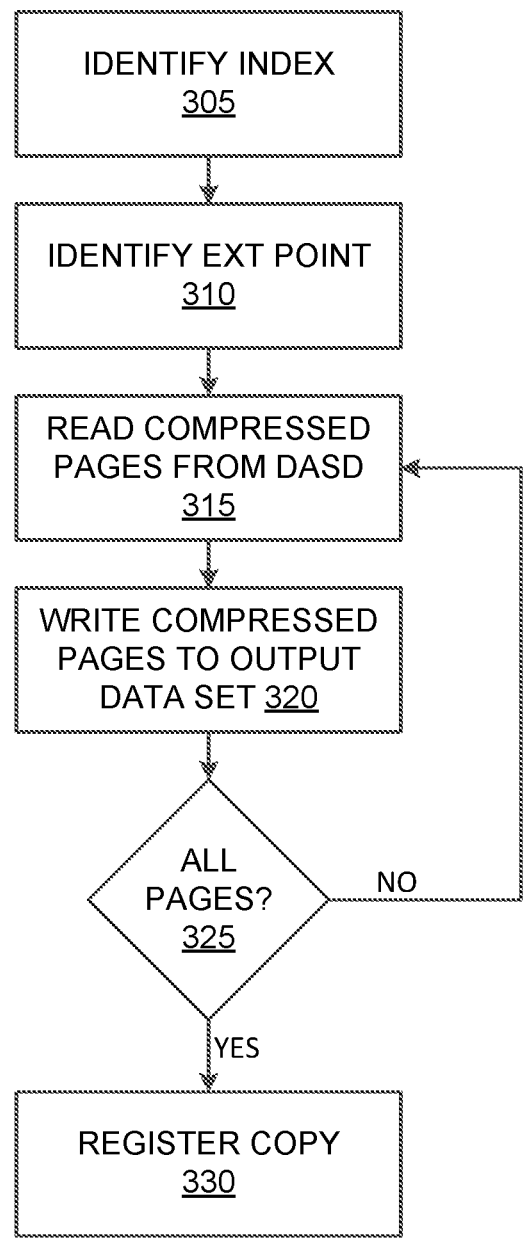
FIG. 3 shows, in flow chart form, a compressed index copy process in accordance with one embodiment of the invention.

Referring now to FIG. 3, index backup process 300 in accordance with one embodiment of the invention begins by identifying the in-use compressed database index to be backed-up, the "target" index (block 305). Recall, within memory buffer 125 multiple groups of data may exist—some related to a first database's data, some to a first index and others to a second database's data and/or index. Accordingly, acts in accordance with block 305 determine what pages in memory buffer 125 are associated with the target index. Once the proper index has been identified, backup process 300 determines the indices externalization point (block 310). As used herein, the phrase "externalization point" means that point in time corresponding to the oldest change to the index that has not been externalized to external storage. In operation, this equates to the time at which the earliest update to a page of the target index in buffer memory 125 was made and not yet externalized. In an embodiment developed for the DB2 database, the externalization point may be identified by an indices log record sequence number (LRSN) or relative byte address (RBA). As one of ordinary skill in the art would recognize, the LRSN (RBA) represents a specific entry in a DB2 log file corresponding to a point in time at which an entry in the index was modified.

By way of example only, consider Table 1 below. At some time after 0:00:06 the illustrative index has six pages in memory buffer 125 (P1→P6). The least recently externalized page is P2 (having been last externalized at 00:00:02). Thus, the indices externalization point would be 0:00:02.

TABLE 1

Externalization Time Example

| Page | Time into Buffer 125 | Last Externalization Time |
|---|---|---|
| P1 | 0:00:00 | 0:00:04 |
| P2 | 0:00:01 | 0:00:02 |
| P3 | 0:00:01 | 0:00:03 |
| P4 | 0:00:03 | 0:00:04 |
| P5 | 0:00:02 | 0:00:03 |
| P6 | 0:00:04 | 0:00:06 |

Each compressed page of the target index is then read from external storage (block 315) and written to one or more output data sets or files (block 320). The output data set could be stored on the same external storage device(s) on which the target index resides, or it could be stored on one or more alternative storage devices (e.g., a network coupled file server). The acts of blocks 315 and 320 are repeated until the entire target index has been copied (block 325). Once the target index has been completely copied (the "YES" prong of block 325), the compressed copy of the compressed target index is registered (block 330). As used herein, the term "register" means to record an identifier and the externalization point for the compressed index copy to non-volatile storage. Typically, this may be done by making an entry in a database table and/or log file maintained for this purpose. The purpose of registration is to enable an application (e.g., a restore function or utility for a database management system) to identify the target indices copy and to associate the indices copy with the identified externalization time. To this extent, registration may be considered any process that accomplishes this task.

It is significant that backup process 300 doss not need to employ locks. Users of an index being backed-up in accordance with the invention are not obstructed from making updates to the index during acts in accordance with blocks 300-330. Accordingly, backup processes 300 is non-obtrusive. One reason for this beneficial consequence is that disk storage controllers serialize access to data stored thereon (i.e., the storage device(s) on which the target index is retained). Thus, if a page of the target index is being externalized at the same time process 300 is attempting to read it (i.e., during block 315), process 300 reads the page either before or after it is externalized. Either result is acceptable because the page contains the LRSN or RBA of that version of the page. As noted above, the LRSN or RBA may be used during recovery operations (as discussed below) to determine what updates need be applied to make the page consistent.

While the description of process 300 has been couched in terms of making a backup copy of an entire target index, such a limitation is not inherent. Acts in accordance with block 305 could identify a target index and that portion of the index to be backed-up (e.g., one or more data sets). In embodiments of this type, acts in accordance with block 325 would check to see if all of the pages identified during block 305 had been copied.

In one embodiment each portion of a compressed index copy may be associated with a time tag. The time tag could equate to the time at which the portion was last externalized before the backup copy was initiated or the time at which the compressed index copy was made. The first approach is described above. In the second approach, if a page of the target compressed index was not in-use (i.e., not in memory buffer 125) at the time backup process 300 was initiated, one can associate the backup process time with that page rather than the externalization time as previously described. This is because if the page is not in working memory (e.g., buffer memory 125), then it was externalized at a time before backup process 300 was initiated and had not been modified between that time and when backup process 300's externalization point. One benefit of this approach is that when the page(s) is restored, the restore utility will only need to look for log entries at or after the time the compressed index backup copy was made (and not the externalization time for those portions that were in-use). This could speed up the restoration process by reducing the amount of log data that needs to be processed for those pages that were up-to-date and on external storage at the time the compressed backup copy was made (see discussion below).

Figure 4A:
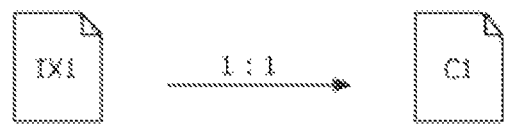
FIG. 4A shows one illustrative backup scenario in accordance with the invention.
Figure 4B:
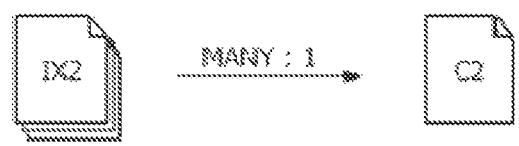
FIG. 4B shows another illustrative backup scenario in accordance with the invention.
Figure 4C:
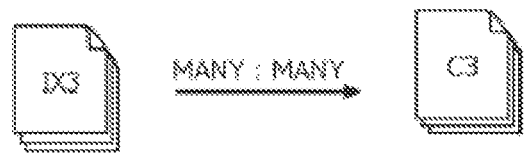
FIG. 4C shows another illustrative backup scenario in accordance with the invention.

Referring to FIG. 4A, in one embodiment a target compressed index may be stored as a single data set or file (IX1) which, in accordance with process 300, may be backed-up (in compressed form) into a single compressed index backup data set or file (C1). In another embodiment, as shown in FIG. 4B, a partitioned target compressed index (IX2)—that is a target index comprising multiple data sets or files—may be backed-up into a single output compressed data set or file (C2). Embodiments of the type shown in FIGS. 4A and 4B may register a single externalization point for each compressed backup copy (i.e., C1 or C2). In the embodiment of FIG. 4B, additional information will generally be retained to enable the compressed backup copy (i.e., C2) to be broken into its multiple partitions during a subsequent restore operation (see discussion below). In still another embodiment, see FIG. 4C, a partitioned target compressed index (IX3) may be copied into multiple compressed data sets or files (C3). Embodiments of this latter type may register an externalization point for each compressed backup data set. Alternatively, all partitions in the target compressed index that share a common externalization point may be associated with a single registration entry and backup data set or file. As previously stated, the significance of recording an output data set's associated externalization time is so that a subsequent restore operation can determine where in the appropriate log file(s) to begin when bringing the restored index up-to-date (see discussion below).

Figure 5:
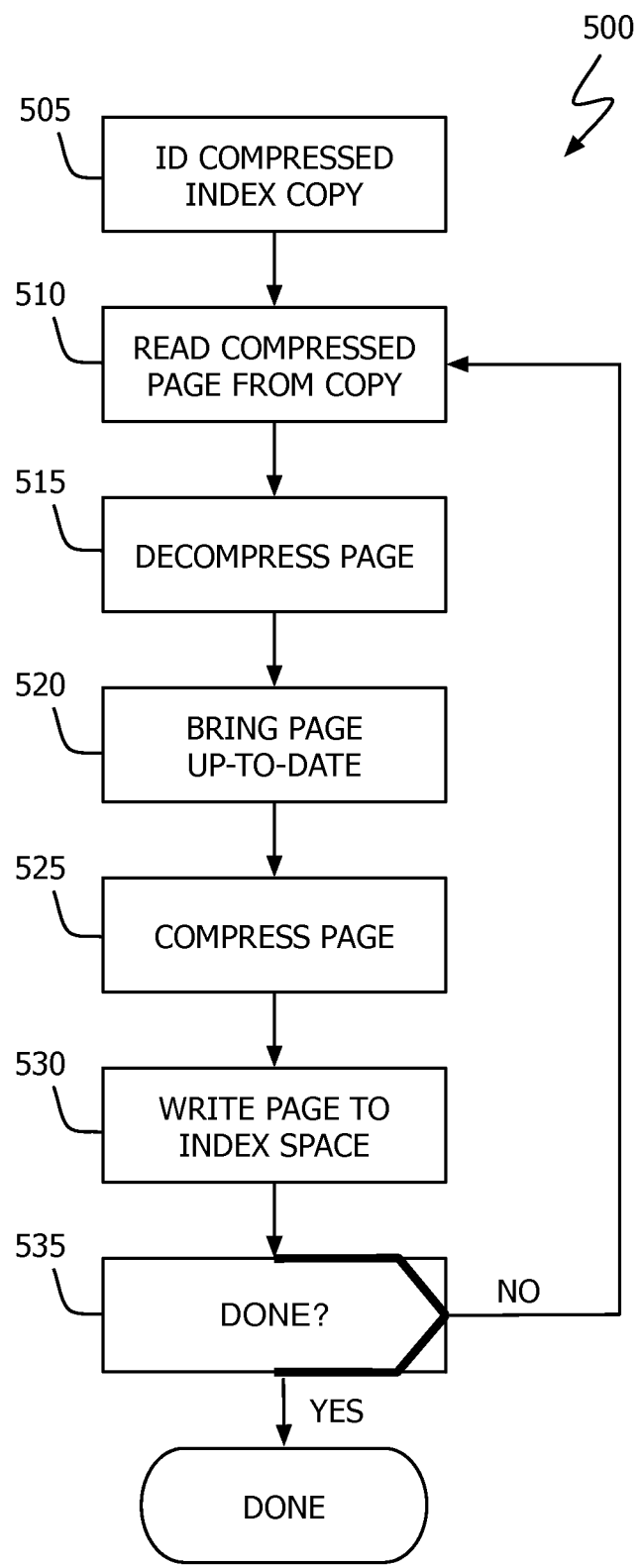
FIG. 5 shows, in flow chart form, a compressed index restore process in accordance with one embodiment of the invention.

Referring now to FIG. 5, compressed index restore process 500 in accordance with one embodiment of the invention begins by identifying the compressed index that is to be restored (block 505). Information recorded during the registration process of block 330 may be used for this purpose. Next, a page from the identified compressed index copy is read (block 510)—the compressed backup copy having been generated in accordance with process 300. (Unless otherwise noted, the term "page" can refer to one or more pages of information.) The page is then decompressed (block 515) and brought up-to-date or consistent as to a specified time (block 520). As would be recognized by those of ordinary skill in the art, the act of bringing a page up-to-date involves identifying changes that have been made to the index page after the time at which the compressed backup was made and applying those updates to the page up to the time specified by the restore operation. Restore operations typically use log file entries to determine what changes have been made to a page. In a DB2 environment, log entries may be identified by LRSN or RBA values. Once known, those changes may be applied to the page under operation (i.e., that page decompressed in accordance with block 515) and brought up-to-date. Here, "up-to-date" generally means to make consistent up to any time up to or before the restore operation was initiated but after the time the compressed backup was made.

Referring again to FIG. 5, once up-to-date, the page is compressed (block 525) and written to the target database's index space (block 530). If additional pages of the identified compressed index copy remain to be processed (the "NO" prong of block 535), acts in accordance with block 510-530 are repeated for those pages. If all pages in the identified compressed index have been processed (the "YES" prong of block 535), restore operation 500 is complete.

As described hereto, a database index that is stored in compressed form on external storage (e.g., disk units 110 and 115) and which is currently in-use (i.e., has one or more pages in working memory 125 in an uncompressed format and that is within the control of a programmable control device executing a database management application—e.g., PCD(s) 135) may be backed-up without significantly interrupting access to the index. One benefit of this approach is that pages of the index being backed-up are not brought into memory and decompressed —thus saving processor time, input-output processing time and working memory space. Another benefit of the invention is that the resulting backup copy is compressed and, as a consequence, uses less external storage than prior art backup methods applicable to compressed indices. Another, and unexpected, benefit of the invention is that because index pages are not brought into memory during backup operations, compressed index pages may be copied via hardware (e.g., during the acts of blocks 315 and 320). That is, by technology that can copy the compressed index pages independent of the processor performing the backup operation (i.e., wherein the processor performing the backup operation does not directly mediate the transfer or bring copies of the compressed pages into working memory). One illustrative example of such a hardware copy technique is the Snapshot feature for DB2, developed and distributed by BMC Software, Inc. Use of this technology allows an index backup copy to be made substantially independent of the processor(s) on which the backup process is executing (eliminating substantially all of the input-output and data transfer time associated with copying).

In yet another embodiment, an incremental backup copy of a compressed database index may be made. As one of ordinary skill in the art would recognize, an incremental backup copy is a backup copy of target data (e.g., a compressed database index) that includes only data that has changed/modified since the last backup was performed.

Figure 6:
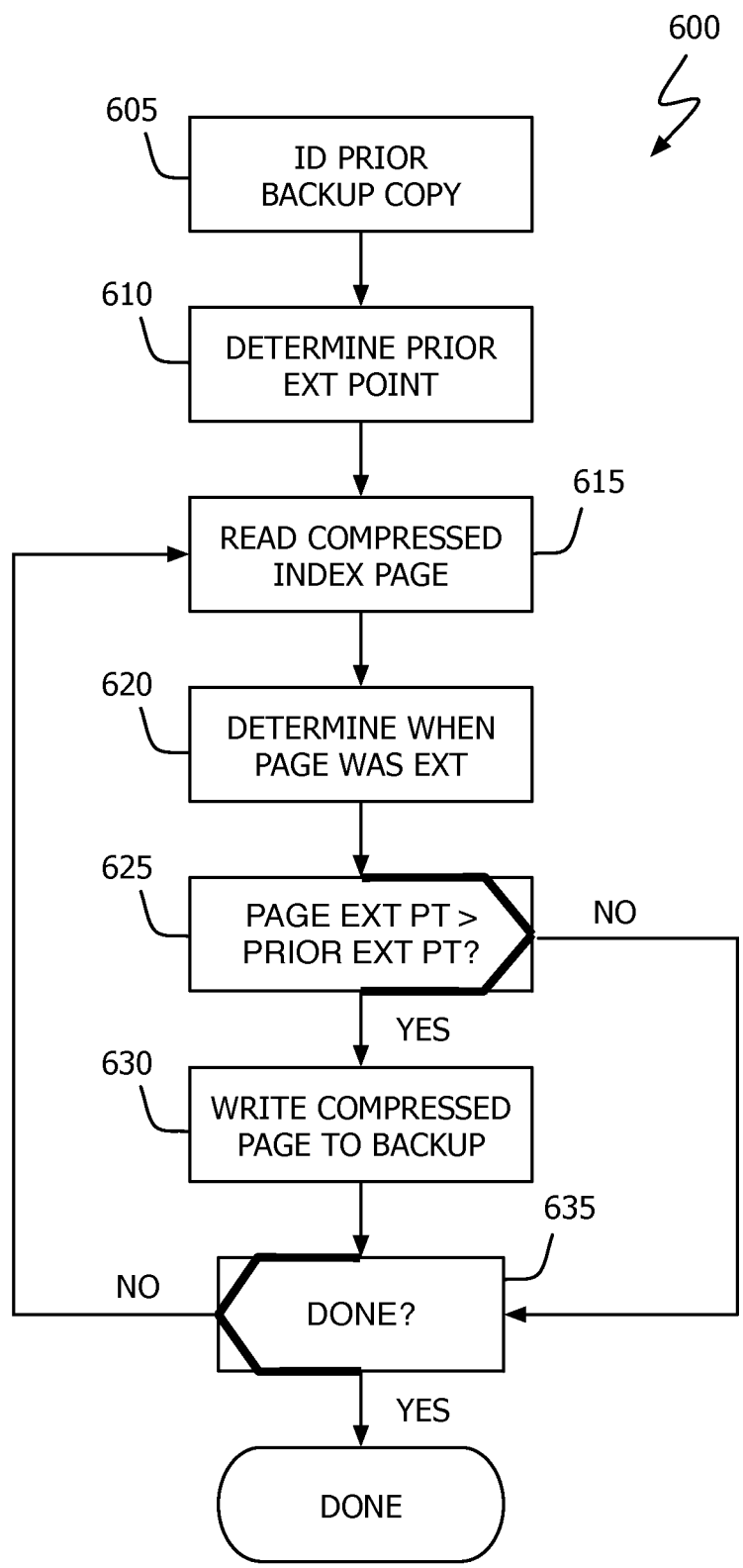
FIG. 6 shows, in flow chart form, an incremental backup process in accordance with one embodiment of the invention.

Referring to FIG. 6, incremental backup process 600 begins when a target indices prior backup copy is identified (block 605). In one instance, a user may identify a prior backup copy directly. In another instance, a user may identify a target index and the prior backup copy is determined automatically. In yet another embodiment, a user may directly specify both the target compressed index and the prior backup copy. (The "prior" backup may itself be an incremental backup.) Once identified, the externalization point for the prior backup copy is determined (block 610). In one embodiment, the prior backup's externalization time may be obtained through the medium used to register the compressed index when backed-up in accordance with process 300 (e.g., a database record or log entry). In another embodiment, this information may be available in header information associated with the prior compressed backup. In yet another embodiment, this information may be available in the header of each page of the prior compressed backup copy. Next, a page of the target compressed index is read into working memory (block 615) and the page's externalization time is determined (block 620). With respect to determining a page's externalization point, each page of a target database index written to long-term storage (e.g., disk unit 110) includes this information in its header information. For example, in an implementation developed for DB2, each page's externalization time (represented by a LRSN) is written to that page's header information. It is recognized that the entire page need not be brought into working memory, just the page's header information. In most cases it is not possible to do this because of the way information is retrieved from long-term storage devices. In those cases where it is, however, retrieving only header information may reduce the amount of data transferred and, as a result, reduce the time needed to make an incremental backup in accordance with process 600.

Once the page's externalization time is known, it is compared with the prior backup's externalization time as identified in block 610. If the page's externalization time is greater than the prior backup's externalization time (the "YES" prong of block 625), this means that the page was externalized after the prior backup. As a consequence, changes may have been made to the page after the prior backup's externalization point and it is, therefore, written to the incremental backup's output data set (block 630). It should be recognized that even though a compressed index page may be brought into working memory in accordance with block 615, it need not be uncompressed. If the page's externalization time is less than or equal to the prior backup's externalization time (the "NO" prong of block 625), this means that the page was externalized before (or at the same time) the prior backup and has not been modified since. In this case, the page need not be written to the incremental backup's output data set. Following the acts of blocks 625 or 630, a check is made to determine if all of the target indices pages have been reviewed. If they have (the "YES" prong of block 635), incremental backup process 600 is complete. If there is at least one page of the target compressed index that has not been reviewed (the "NO" prong of block 635), processing continues with the next compressed page of the target index at block 615.

Various changes in the materials, components, circuit elements, as well as in the details of the illustrated operational methods are possible without departing from the scope of the following claims. For instance, the illustrative system of FIG. 1, additional computer systems may be present. These additional computer systems may be coupled to computer 105 and/or external storage units 110 and 115 through a computer network. This computer network may be local (e.g., a local area network) or external (e.g., an extranet or the Internet). In some embodiments, the target compressed index may be encrypted in addition to being compressed. In these embodiments, each portion of the target index may be decrypted prior to acts in accordance with FIG. 3, 5 or 6 and re-encrypted prior to writing each portion to external storage. In still other embodiments, compressed backup copies in accordance with FIG. 3, 5 or 6 may be stored in virtually any format (e.g., cabinet format).

In addition, acts in accordance with FIGS. 3, 5 and 6 may be performed by a programmable control device (e.g., PCD 135) executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

In the Interest of clarity, not all features of an actual implementation are described in this specification. It will of course be appreciated that in the development of any such actual implementation (as in any software development project), numerous programming decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking for a database administrator and/or developer of ordinary skill having the benefit of this disclosure.

What is claimed is:

1. A non-transitory storage device tangibly embodying program instructions that, when executed by a processor, are configured to cause a general purpose computer to:
   identify a target in-use compressed index stored in storage, a first portion of the target in-use compressed index being uncompressed and in working memory and accessed by a first process and a second process through a first application and a second application, the first application being different than the second application, a second portion of the target in-use compressed index being compressed;
   identify an externalization point for the target in-use compressed index, the externalization point being a time of oldest change to the target in-use compressed index that has not been externalized to storage;
   copy compressed pages of the target in-use compressed index from the storage to one or more files without uncompressing the compressed pages, the copied and compressed pages being a compressed backup copy; and
   record an identifier and the externalization point for the compressed backup copy in a log.

2. The storage device of claim 1, wherein:
   the compressed pages of the target in-use compressed index are partitioned into multiple data sets; and
   the copying compressed pages includes copying compressed pages of the target in-use compressed index from the storage to multiple compressed files.

3. The storage device of claim 1, wherein the instructions are configured to cause the general purpose computer to identify the target in-use compressed index, identify the externalization point, copy the compressed pages, and record the identifier and externalization point without employing locks.

4. The storage device of claim 1, wherein identifying the target in-use compressed index comprises identifying the target in-use compressed index and one or more data sets in the target in-use compressed index to be backed up.

5. The storage device of claim 4, wherein the instructions are further configured to cause the general purpose computer to determine whether all of the data sets have been copied.

6. The storage device of claim 1, wherein each portion of the compressed backup copy is associated with a time tag, the time tag indicating a time at which the portion was last externalized before the compressed backup copy was made.

7. The storage device of claim 1, wherein the instructions are further configured to cause the general purpose computer to:
   break the target in-use compressed index into multiple partitions;
   copy the partitioned target in-use compressed index into multiple compressed files; and
   record an externalization point for each of the multiple compressed files in the log.

8. The storage device of claim 1, wherein the target in-use compressed index comprises an encrypted compressed index.

9. The storage device of claim 1, wherein the identifying the externalization point comprises identifying a single externalization point for the target in-use compressed index.

10. The storage device of claim 1, wherein the identifying the externalization point comprises identifying a plurality of externalization points, each of the plurality of externalization points representing an externalization point for a different portion of the target in-use compressed index.

11. The storage device of claim 1, wherein the instructions are further configured to cause the general purpose computer to associate the recorded identifier with the recorded externalization point.

12. The storage device of claim 1, wherein the target in-use compressed index was compressed using a technique wherein compression of a first page of the target in-use compressed index did not affect content of a second page of the target in-use compressed index.

13. The storage device of claim 1, wherein an uncompressed version of a page of the target in-use compressed index in working memory is locked, preventing the uncompressed version of the page from being updated.

14. A method comprising:
   identifying a target in-use compressed index stored in storage, a first portion of the target in-use compressed index being uncompressed and in working memory and accessed by a first process and a second process through a first application and a second application, the first application being different than the second application, a second portion of the target in-use compressed index being compressed;
   identifying an externalization point for the target in-use compressed index, the externalization point being a time of oldest change to the target in-use compressed index that has not been externalized to storage;
   copying compressed pages of the target in-use compressed index from the storage to one or more files without uncompressing the compressed pages, the copied and compressed pages being a compressed backup copy; and
   recording an identifier and the externalization point for the compressed backup copy in a log.

15. The method of claim 14, wherein:
   the compressed pages of the target in-use compressed index are partitioned into multiple data sets; and
   the copying compressed pages includes copying compressed pages of the target in-use compressed index from the storage to multiple compressed files.

16. The method of claim 14, wherein the identifying the target in-use compressed index, identifying the externalization point, copying the compressed pages, and recording the identifier and externalization point are performed without employing locks.

17. The method of claim 14, wherein identifying the target in-use compressed index comprises identifying the target in-use compressed index and one or more data sets in the target in-use compressed index to be backed up.

18. The method of claim 14, wherein each portion of the compressed backup copy is associated with a time tag, the time tag indicating a time at which the portion was last externalized before the compressed backup copy was made.

19. The method of claim 14, further comprising:
breaking the target in-use compressed index into multiple partitions;
copying the partitioned target in-use compressed index into multiple compressed files; and
recording an externalization point for each of the multiple compressed files in the log.

20. A computing system comprising:
a processor; and
a non-transitory storage device tangibly embodying program instructions that, when executed by the processor, are configured to cause the computing system to:

identify a target in-use compressed index stored in storage, a first portion of the target in-use compressed index being uncompressed and in working memory and accessed by a first process and a second process through a first application and a second application, a second portion of the target in-use compressed index being compressed;
identify an externalization point for the target in-use compressed index, the externalization point being a time of oldest change to the target in-use compressed index that has not been externalized to storage;
copy compressed pages of the target in-use compressed index from the storage to one or more files without uncompressing the compressed pages, the copied and compressed pages being a compressed backup copy; and
record an identifier and the externalization point for the compressed backup copy in a log.

* * * * *